(12) United States Patent
Belanger et al.

(10) Patent No.: US 11,986,751 B2
(45) Date of Patent: May 21, 2024

(54) SEAL FOR SEPARATION DEVICE

(71) Applicant: Waters Technologies Corporation, Milford, MA (US)

(72) Inventors: Jonathan L. Belanger, Whitinsville, MA (US); Wade P. Leveille, Sr., Douglas, MA (US); Michael O. Fogwill, Uxbridge, MA (US); Joseph D. Michienzi, Plainville, MA (US); Jeffrey Musacchio, Sharon, MA (US)

(73) Assignee: Waters Technologies Corporation, Milford, MA (US)

( * ) Notice: Subject to any disclaimer, the term of this patent is extended or adjusted under 35 U.S.C. 154(b) by 93 days.

(21) Appl. No.: 17/241,480

(22) Filed: Apr. 27, 2021

(65) Prior Publication Data

US 2021/0339166 A1    Nov. 4, 2021

Related U.S. Application Data

(60) Provisional application No. 63/018,058, filed on Apr. 30, 2020.

(51) Int. Cl.
*B01D 15/22* (2006.01)
*B01D 15/10* (2006.01)
(Continued)

(52) U.S. Cl.
CPC ............. *B01D 15/22* (2013.01); *B01D 15/10* (2013.01); *F16J 15/34* (2013.01); *G01N 30/60* (2013.01);
(Continued)

(58) Field of Classification Search
CPC ........ B01D 15/10; B01D 15/22; G01N 30/60; G01N 30/6004; G01N 30/6026; F16J 15/34
See application file for complete search history.

(56) References Cited

U.S. PATENT DOCUMENTS 9,056,264 B2    6/2015  Hahn et al.
9,134,283 B2    9/2015  Hochgraeber et al.
(Continued)

FOREIGN PATENT DOCUMENTS

EP    2516912 B1    4/2015

OTHER PUBLICATIONS

Gritti, Fabrice "Vacuum-Jacketed Columns: Maximum Efficiency, Easy Deployment Without Oven, and Improvied LC-MS Performance," May 1, 2019, Special Issues, vol. 32, Issue 5, pp. 8-13, ChromatographyOnline.com.

*Primary Examiner* — Benjamin L Lebron
(74) *Attorney, Agent, or Firm* — Schmeiser, Olsen & Watts LLP (57) ABSTRACT

Described are apparatuses, devices, and systems implementing seals for separation devices. An apparatus for a separation device may include an end nut shaped to be positioned on one of an inlet side and an outlet side of the separation device. The end nut may be further shaped to mate with a connecting fitting. The apparatus may further include a face seal having a device side and a fitting side. The face seal may be positioned, at least in part, in the end nut on the device side of the face seal. The face seal may be positioned to interface with the connecting fitting on the fitting side of the face seal upon the end nut being mated with the connecting fitting. The apparatus may also include a face seal bore of the face seal being axially alignable with at least one of an inlet and an outlet of the separation device.

17 Claims, 9 Drawing Sheets

(51) Int. Cl.
*F16J 15/34* (2006.01)
*G01N 30/60* (2006.01)

(52) U.S. Cl.
CPC ..... *G01N 30/6004* (2013.01); *G01N 30/6026* (2013.01)

(56) References Cited

U.S. PATENT DOCUMENTS

| | | |
|---|---|---|
| 9,334,989 B2 | 5/2016 | Jencks et al. |
| 10,060,560 B2 * | 8/2018 | Belanger ................ B01D 15/40 |
| 10,386,344 B2 | 8/2019 | Leveille et al. |
| 10,514,117 B2 | 12/2019 | Leveille |
| 2016/0116088 A1 | 4/2016 | Graham et al. |
| 2019/0186670 A1 | 6/2019 | Jencks et al. |
| 2019/0317062 A1 | 10/2019 | Fogwill et al. |
| 2020/0300821 A1 | 9/2020 | Cormier et al. |
| 2021/0341437 A1 | 11/2021 | Leveille et al. |

* cited by examiner

SEAL FOR SEPARATION DEVICE

RELATED APPLICATION

This application claims the benefit of the earlier filing date of U.S. Provisional Patent Application Ser. No. 63/018,058, filed Apr. 30, 2020 and titled "Seal for Separation Device," the entirety of which is incorporated herein by reference.

FIELD OF THE INVENTION

The invention relates generally to a seal for a separation device. More specifically, the invention relates to apparatuses, devices, and systems implementing seals for separation devices.

BACKGROUND

Separation systems and devices, including chromatography systems and devices, may be used to separate a mixture into its constituents. Chromatography systems may include HPLC (High Performance Liquid Chromatography) systems, UPLC (Ultra Performance Liquid Chromatography) systems, and SFC (Supercritical Fluid Chromatography) systems. HPLC systems may use high pressure which may typically range from 1,000 psi (pounds per square inch) to approximately 6,000 psi, to generate the fluid flow required for liquid chromatography (LC) in packed columns. UPLC systems may use columns with smaller particulate matter and may require higher pressures approaching 20,000 psi. SFC systems may use highly compressible mobile phases, which may use carbon dioxide ($CO_2$) as a principle component.

In a typical LC system, a solvent delivery system may deliver a mixture of liquid solvents to an injection system where sample is injected into the solvent flow or mobile phase. The mobile phase may carry the sample through a separation device such as a chromatography column. In the column, the mixture of the sample and solvents may divide into bands depending upon the interaction of the mixture with the stationary phase in the column. A detector may analyze these bands as they exit the column.

Separating devices such as chromatography columns may use sealing components to prevent leaks as the sample and solvents enter or exit the column. Some separation devices may use threaded fittings with cone-shaped sealing surfaces that may be marred, scored, or scratched during installation or removal. Once a threaded fitting on a separation device is damaged or once the sealing surface or sealing component fails, the entire separation device may need to be replaced.

SUMMARY

In an aspect of the present disclosure, an apparatus for a separation device is provided. The apparatus may include an end nut with a face seal. The end nut may be shaped to be positioned on one of an inlet side of the separation device and an outlet side of the separation device. The end nut may be further shaped to mate with a connecting fitting. The face seal may have a device side and a fitting side. The face seal may be positioned, at least in part, in the end nut on the device side of the face seal. The face seal may be positioned to interface with the connecting fitting on the fitting side of the face seal upon the end nut being mated with the connecting fitting. A face seal bore of the face seal may be axially alignable with at least one of an inlet of the separation device on the inlet side of the separation device, and an outlet of the separation device on the outlet side of the separation device.

One or more of the following features may be included. The end nut may be threaded on an inner portion of the end nut and the end nut may be shaped to receive the connecting fitting. Alternatively, the end nut may be threaded on an external portion of the end nut and the end nut may be shaped to be received by the connecting fitting. The face seal may be in the form of a cap seal. The face seal may be loadable against a surface of the end nut. The face seal may be integrated with the end nut. The face seal may be removeable from the end nut.

In an implementation, the face seal may be made, at least in part, from a material selected from the group consisting of a polymeric material, a polyimide, PEEK, an alloy, and stainless steel. The end nut and the face seal may improve a fluidic seal between the separation device and the connecting fitting and may thereby reduce at least one of sample carryover, sample dispersion, and leaking. At least a portion of the end nut may be shaped at least one of cylindrically and hexagonally.

In an aspect of the present disclosure, a separation device may include an end nut with a face seal. The end nut may be positioned on one of an inlet side of the separation device and an outlet side of the separation device. The end nut may be shaped to mate with a connecting fitting. The face seal may have a device side and a fitting side. The face seal may be positioned, at least in part, in the end nut on the device side of the face seal. The face seal may be positioned to interface with the connecting fitting on the fitting side of the face seal upon the end nut being mated with the connecting fitting. The face seal bore of the face seal may be axially aligned with at least one of an inlet of the separation device on the inlet side of the separation device, and an outlet of the separation device on the outlet side of the separation device.

One or more of the following features may be included. The end nut may be mated with the connecting fitting. The end nut may be threaded on an inner portion of the end nut, the connecting fitting may be threaded on an outer portion of the connecting fitting, and the end nut may receive the connecting fitting. Alternatively, the end nut may be threaded on an external portion of the end nut, the connecting fitting may be threaded on an inner portion of the connecting fitting, and the end nut may be received by the connecting fitting. The connecting fitting may include a protrusion loadable against the fitting side of the face seal to create a fluidic seal. The face seal may load against a surface of the end nut upon the end nut being mated with the connecting fitting to create a fluidic seal. The face seal may be removeable from the end nut and replaceable, thereby allowing the separation device to be reused upon failure of the face seal.

In an implementation, the end nut may be an inlet end nut positioned on the inlet side of the separation device. The separation device may further include an outlet end nut positioned on the outlet side of the separation device. The inlet end nut and the outlet end nut may be different in at least one of shape and size. The separation device may be one of a chromatography column and a chromatography trap. The end nut and the face seal may improve a fluidic seal between the separation device and the connecting fitting and thereby reduce at least one of sample carryover, sample dispersion, and leaking.

In an aspect of the present disclosure, a chromatography system may include a chromatography column, and end nut, and a face seal. The end nut may be positioned on one of an inlet side of a chromatography column and an outlet side of the chromatography column. The end nut may be mated with a connecting fitting. The face seal may have a column side and a fitting side. The face seal may be removably positioned, at least in part, in the end nut on the column side of the face seal. The face seal may interface with the connecting fitting on the fitting side of the face seal. A face seal bore of the face seal may be axially aligned with at least one of an inlet of the chromatography column on the inlet side of the chromatography column, and an outlet of the chromatography column on the outlet side of the chromatography column. The end nut may be threaded on an external portion of the end nut. The connecting fitting may be threaded on an inner portion of the connecting fitting. The end nut may be received by the connecting fitting. The face seal may load against a surface of the end nut upon the end nut being mated with the connecting fitting to create a fluidic seal between the chromatography column and the connecting fitting, thereby reducing at least one of sample carryover, sample dispersion, and leaking.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

As discussed above, separating devices such as chromatography columns may use sealing components to prevent leaks as the sample and solvents enter or exit the column. When the sealing component fails or is damaged, the entire column may need to be replaced. Often, the column itself remains functional but must be wasted because the sealing component is damaged. Separation devices such as chromatography columns may be expensive.

For example, a chromatography column may have two stainless steel (or other alloy) end nuts that may have threaded fittings used to secure them to the column. When the threaded fitting (which may be gold plated for protection) is torqued onto the column, it may be overtightened. The end nut may be a ferrule-style component and may become deformed. If there is any damage and the column/end nut start to leak, the entire unit may need to be replaced. The user may not physically remove the end nut from the column because when the column is assembled, an interior bed or packaging material has been initially pressurized. If the end nut is removed, the interior material may start to come out of the column. Typically, the user will discard the column and purchase a new column. Columns may cost $1000 to $20K depending on size and scale. Thus, there may be a need for a sealing component which is replaceable such that the separation device (e.g., chromatography column) may be salvaged or reused upon failure of the sealing component.

Figure 1:
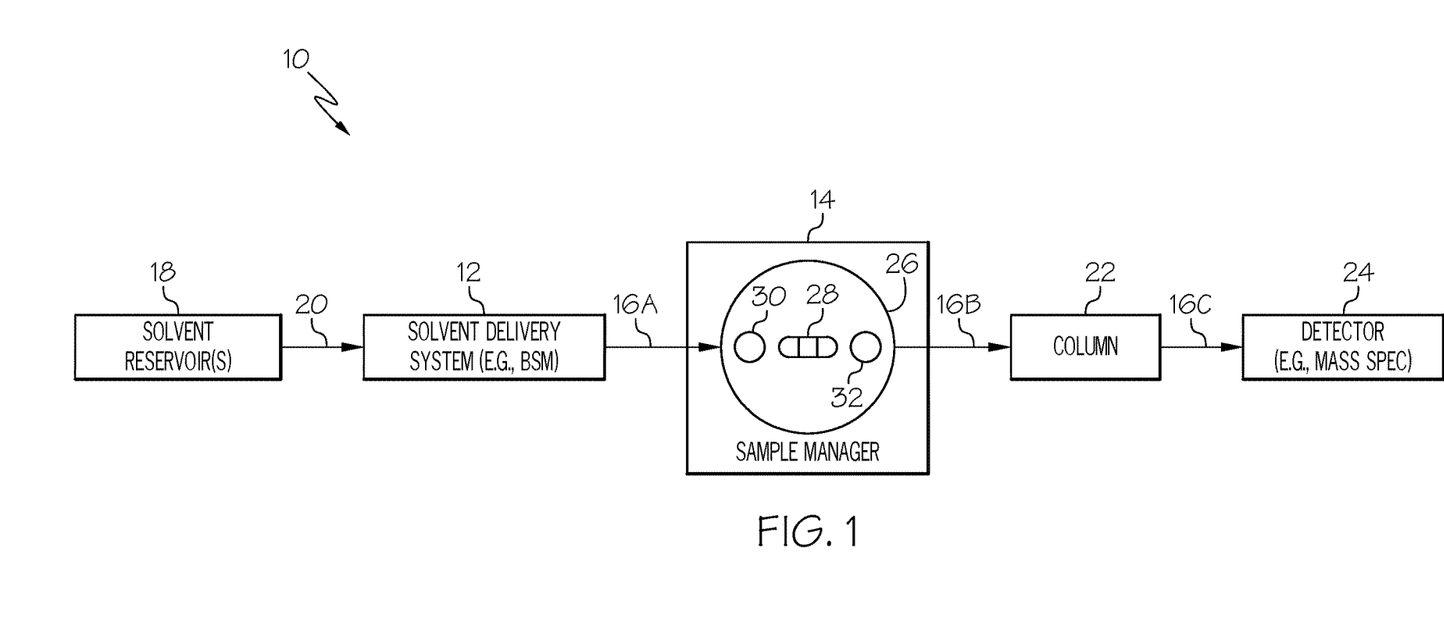
FIG. 1 depicts a block diagram of an example embodiment of a separation system in accordance with aspects of the present disclosure.

FIG. 1 shows an example embodiment of a separation system in accordance with the present disclosure. The separation system may include a separation device. For example, the separation system may be a liquid chromatography system such as liquid chromatography system 10 for separating a sample into its constituents. Liquid chromatography system 10 may include a separation device such as chromatography column 22. Liquid chromatography system 10 may be an HPLC, UPLC, SFC, or other chromatography system.

Liquid chromatography system 10 may include a solvent delivery system 12 in fluidic communication with a sample manager 14 (which may also be called an injector or autosampler) through a fluidic tube 16A. Solvent delivery system 12 may include pumps (not shown) in fluidic communication with solvent (or fluid) reservoirs 18 from which the pumps draw solvents through a fluidic conduit 20, which may be a fluidic conduit, line, tube or channel. It should be noted that while the term "tube" is used herein for illustrative purposes to describe the techniques and features of the present disclosure, other fluidic conduits or channels are also within the scope of the present disclosure. Chromatography column 22 may be in fluidic communication with sample manager 14 through fluidic tube 16B. Fluidic tube 16C may couple the output port of chromatography column 22 to a detector 24. Detector 24 may be, for example, a mass spectrometer, a UV detector, or other type of detector.

Through fluidic tube 16C, detector 24 may receive the separated components from chromatography column 22 and produce an output from which an identity and quantity of analytes may be determined. As described herein, at various locations in liquid chromatography system 10, fluidic tubes 16A, 16B, and 16C (generally 16) may be coupled to system components using high pressure fittings. Each fluidic tube 16 may refer to a section of tubing or a single tube. Each tubing section may include one tube or multiple tubes joined in series (e.g., by valves, tees, etc.).

Sample manager 14 may include an injector valve 26 with a sample loop 28. Sample manager 14 may operate in one of two states: a load state and an injection state. In the load state, the position of injector valve 26 may be such that sample manager 14 loads the sample into the sample loop 28. In the injection state, the position of injector valve 26 may change such that sample manager 14 introduces the sample in sample loop 28 into continuously flowing mobile phase arriving from the solvent delivery system 12. With injector valve 26 in the injection state, the mobile phase may carry the sample into chromatography column 22. To accomplish this, the mobile phase may arrive at injector valve 26 through an input port 30 and may leave the injector valve with the sample through an output port 32.

Various fittings may be present within liquid chromatography system 10. For example, such fittings may be present where fluidic tube 16A connects to input port 30 of injector valve 26, where fluidic tube 16B connects to output port 32 of injector valve 26 and to an inlet side of chromatography column 22, and where fluidic tube 16C connects to the outlet side of chromatography column 22 and to detector 24.

A separation device such as chromatography column 22 may include column end fittings such as end nuts on the inlet side and the outlet side of the separation device. The end nut may be a threaded ferrule style fitting designed in part to create a seal between the end nut and the separation device. An example end nut may be round or hexagonally shaped, made from stainless steel, and may be about a half-inch to an inch in length. End nuts may be anywhere from one-quarter inch in diameter to 3 inches and larger in diameter for preparatory style separation devices. End nuts may be torqued onto a separation device (e.g., chromatography column) itself to maintain a seal in order for the separation device to operate at high pressures.

Figure 2:
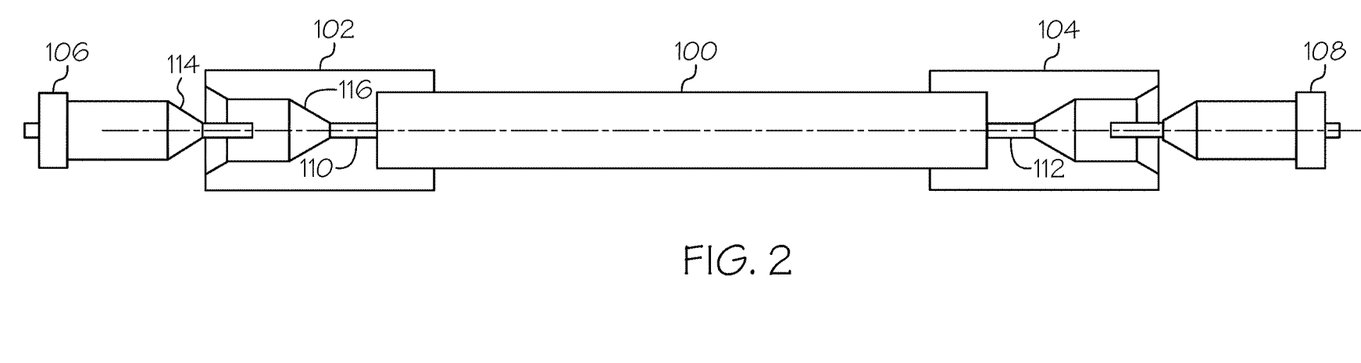
FIG. 2 illustrates an example separation device with end fittings in accordance with aspects of the present disclosure.

Referring now to FIG. 2, an example separation device with end fittings is shown. A separation device such as chromatography column 100 may include column end fittings such as column end nuts 102 and 104. Column end nuts 102 and 104 may be threaded, for example, and may receive connecting fittings 106 and 108, respectively. Connecting fittings 106 and 108 may also be threaded. For example, column end nut 102 may have a female threaded portion with a cone-shape and connecting fitting 106 may have a male threaded portion with a cone-shape.

Ideally, the connecting fittings may form seals with the column end nuts such that tubes near the inlet and outlet sides of the chromatography column are in fluidic communication with tubes in the connecting fittings, but fluid is prevented from leaking outside the tubes. The sealing surfaces between the threaded fittings (e.g., column end nut 102 and connecting fitting 106; and column end nut 104 and connecting fitting 108) may be cone-shaped or conical surfaces (e.g., sealing surfaces 114 and 116).

In order to make the seal, an amount of torque may need to be applied to the threaded connecting fitting (e.g., 106, 108) to generate enough surface stress on the surface of the cone such that a seal is made. For example, connecting fitting 106 may be received by column end nut 102 with enough torque to form a seal such that fluid is prevented from leaking out near tube 110 on the inlet side of chromatography column 100. Similarly, connecting fitting 108 may be received by column end nut 104 with enough torque to form a seal such that fluid is prevented from leaking out near tube 112 on the outlet side of chromatography column 100.

Figure 3:
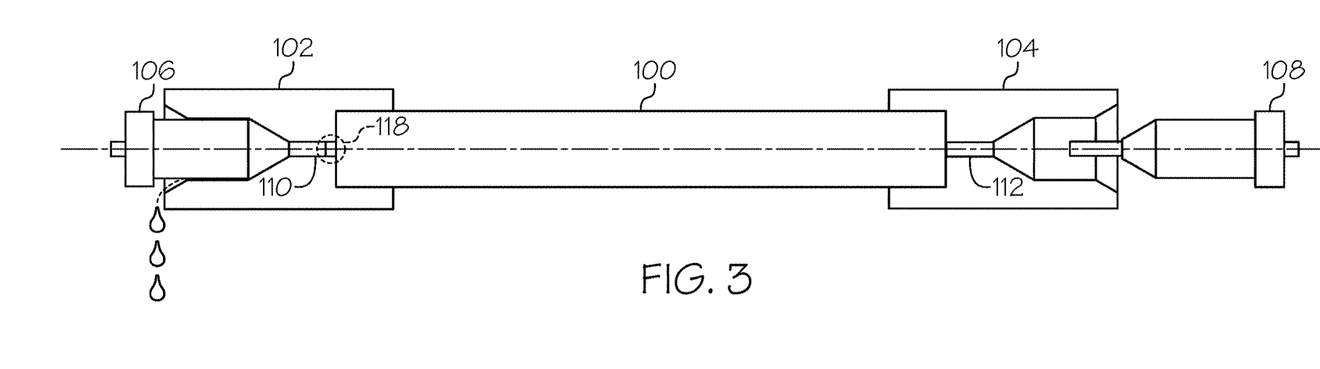
FIG. 3 also illustrates an example separation device with end fittings in accordance with aspects of the present disclosure.

However, in some situations, leaks may occur, as ferrule style fittings may be difficult to use. For example, and referring now to FIG. 3, while connecting fitting 106 may be received by column end nut 102 to form a seal, there may be a void 118 towards a bottom of tube 110 where connecting fitting 106 fails to reach the bottom of tube 110. In other words, connecting fitting 106 may not be seated all the way at the bottom or end of tube 110 near chromatography column 100. Void 118 may be trapped space and, while some or even most of the fluid may be prevented from leaking out of tube 110, leakage may occur at some pressures. Depending on whether the void occurs at an inlet side or outlet side of the chromatography column, it may lead to additional problems including carry-over (e.g., sample contamination in later separation runs not intended to include the sample) and sample dispersion.

Using the techniques and features provided in the present disclosure, face seals may be used between connecting fittings and separation devices such as chromatography columns to improve sealing, achieve greater ease of use, and facilitate reusability of the separation device upon sealing failure. For example, column end nuts may employ face seals to improve sealing, promote ease of use, facilitate reusability of separation devices, and thereby minimize the potential for leaks, sample carryover, and sample dispersion.

In an aspect of the present disclosure, an apparatus for a separation device may include an end nut with a face seal. Various designs of end nuts for separation devices within the scope of the present disclosure may allow for a face seal to be integrated with an end nut, or for a face seal to be a component of a mating part of an end nut, such that the face seal is easily installed and/or replaced. Such face seals may operate at very high pressures, including pressures approaching 20,000 psi or greater. End nuts with face seals may be implemented with an external means of axial loading or may be otherwise pushed into a solid member in order to establish a sufficient sealing stress. Various end nut designs within the scope of the present disclosure may include fastening structures including, but not limited to, external/internal threads or tabs, cams, and/or wire bails, among others.

Figure 4:
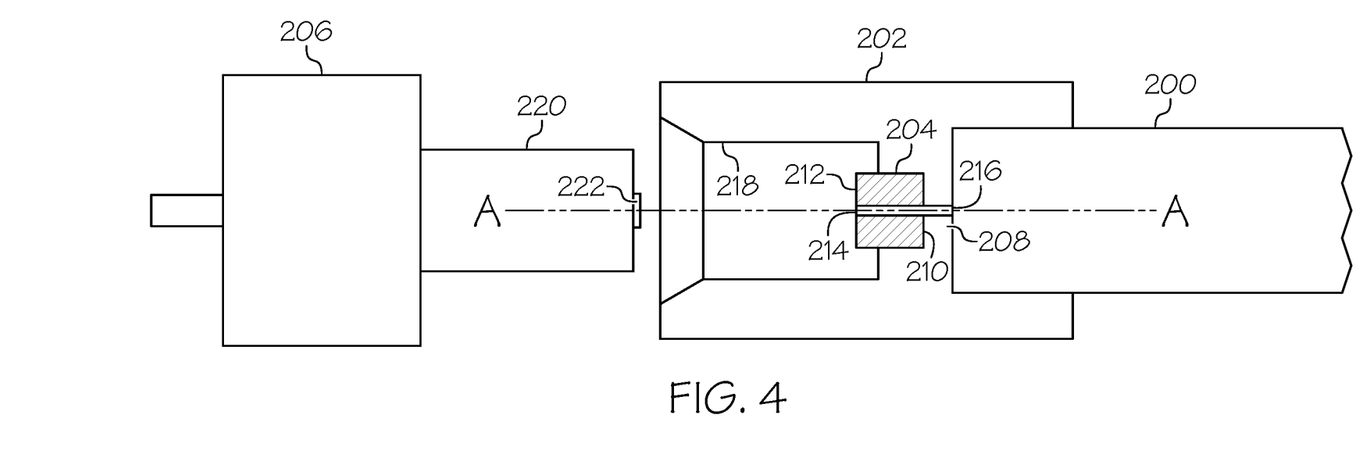
FIG. 4 illustrates an example separation device with an end fitting and connecting fitting in accordance with aspects of the present disclosure.

Referring now to FIG. 4, an example separation device with an end fitting and connecting fitting is shown. The separation device may be a chromatography column 200. An end nut 202 may be shaped to be positioned (and may be positioned) on one of an inlet side (i.e., inlet side 208) of the separation device (e.g., chromatography column 200) and an outlet side (not shown) of the separation device. End nut 200 may be further shaped to mate with (or be mated with) a connecting fitting 206. End nut 200 may include a face seal 204. Face seal 204 may have a device side 210 and a fitting side 212.

The end nut may have a slug of material that sits inside the end nut that forms the face seal. The slug may be cylindrically shaped or otherwise shaped such that it sits inside the end nut. The connecting fitting may be pushed in or threaded into the end nut such that it loads against a surface of the face seal. The face seal may load against a surface of the end nut upon the end nut being mated with the connecting fitting to create a fluidic seal.

It should be noted that while end nuts and connecting fittings described herein may be discussed as being threaded, other variations are within the scope of the present disclosure. For example, an end nut and connecting fitting may be mated without use of threading and the connecting fitting may be loaded onto the end nut through the use of a loading mechanism such as a column enclosure with clamp assembly as described in U.S. Provisional Patent Application 63/017,249, filed on Apr. 29, 2020 and entitled Establishing Fluidic Connections Between Chromatography Components, the entire disclosure of which is incorporated by reference herein.

The face seal may be a device that may sit between the separation device (e.g., chromatography column) and connecting fitting. The face seal may be made from a polymeric material, a polymide, polyether ether ketone (PEEK), stainless steel, an alloy, gold (or be gold plated or plated with another metal), or other similar material.

In an embodiment, face seal 204 may be positioned, at least in part, in end nut 202 on device side 210 of face seal 204. Face seal 204 may be integrated with end nut 202 and may be positioned in a mating portion of end nut 202. Further, face seal 204 may be positioned to interface with connecting fitting 206 on fitting side 212 of face seal 204 upon end nut 202 being mated with connecting fitting 206. A face seal bore 214 of face seal 204 may be axially alignable (e.g., as indicated by dashed line AA) with (or may be axially aligned with) at least one of an inlet 216 of the separation device (e.g., chromatography column 200) on inlet side 208 of the separation device, and an outlet (not shown) of the separation device on the outlet side (not shown) of the separation device. End nut 202 may be threaded on an inner portion 218 (e.g., female threaded portion) of end nut 202 and end nut 202 may be shaped to receive connecting fitting 206. Connecting fitting 206 may be threaded on an outer portion 220 (e.g., male threaded portion) of connecting fitting 206.

In an implementation, the connecting fitting may be a nut that has a tube (or other fluidic conduit) with a washer welded to the tube such that when the connecting fitting is coupled with the end nut/face seal, the washer does not rotate. In this way, the nut of the connecting fitting may be rotated independently and act as a thrust so that material is not sheared from the face seal itself. In various implementations, the connecting fitting may include a male threaded portion or a female threaded portion. When employed on an inlet side of the separation device, a connecting fitting may be in fluidic communication with an upstream injector, injection valve, or other valve (e.g., injector valve 26). When employed on an outlet side of the separation device, a connecting fitting may be in fluidic communication with a downstream detector or other analytical device (e.g., detector 24).

In an implementation, connecting fitting 206 may include a protrusion 222 loadable against fitting side 212 of face seal 204 to create a fluidic seal. As protrusion 222 is loaded against fitting side 212 of face seal 204, protrusion 222 on connecting fitting 206 may generate sufficient stress to make a seal.

Figure 5:
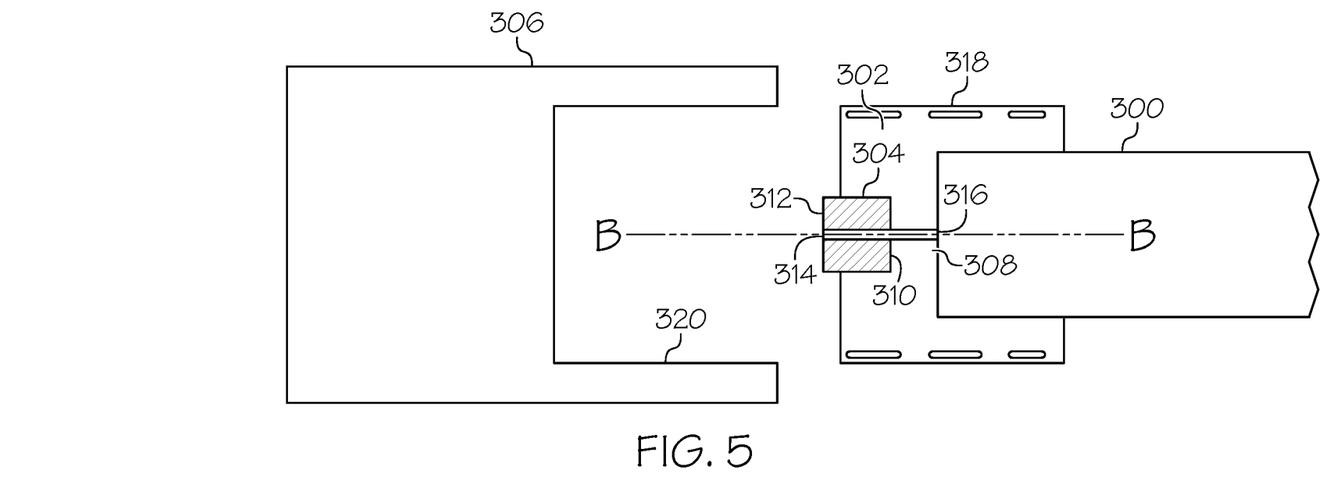
FIG. 5 also illustrates an example separation device with an end fitting and connecting fitting in accordance with aspects of the present disclosure.

In an embodiment, an end nut may be threaded on an external portion of the end nut and the end nut may be shaped to be received by (and may be received by) the connecting fitting. Referring now to FIG. 5, another example separation device with an end fitting and connecting fitting is shown. The separation device may be a chromatography column 300. An end nut 302 may be shaped to be positioned on (and may be positioned on) one of an inlet side (i.e., inlet side 308) of the separation device (e.g., chromatography column 300) and an outlet side (not shown) of the separation device. End nut 302 may be further shaped to mate with (or be mated with) a connecting fitting 306. End nut 302 may include a face seal 304. Face seal 304 may have a device side 310 and a fitting side 312.

Further, face seal 304 may be positioned, at least in part, in end nut 302 on device side 310 of face seal 304. Face seal 304 may also be positioned to interface with (or may interface with) connecting fitting 306 on fitting side 312 of face seal 304 upon end nut 302 being mated with connecting fitting 306. A face seal bore 314 of face seal 304 may be axially alignable (e.g., as indicated by dashed line BB) with (or may be actually aligned with) at least one of an inlet 316 of the separation device (e.g., chromatography column 300) on inlet side 308 of the separation device, and an outlet (not shown) of the separation device on the outlet side (not shown) of the separation device. End nut 302 may be threaded on an external portion 318 of end nut 302 and end nut 302 may be shaped to be received by (or may be received by) the connecting fitting 306. Connecting fitting 306 may be threaded on an inner portion 320 of connecting fitting 306.

Figure 6:
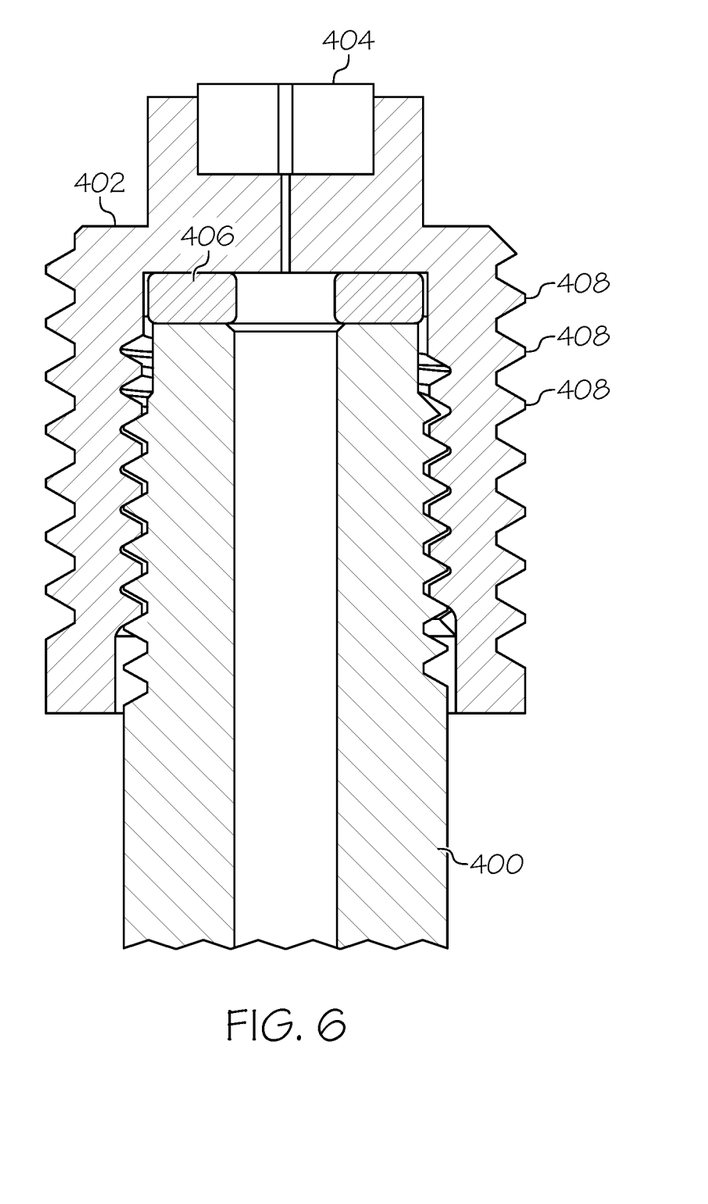
FIG. 6 illustrates an example separation device with an end fitting in accordance with aspects of the present disclosure.

Referring now to FIG. 6, an example separation device with an end fitting is shown. The separation device (e.g., chromatography column 400) may include an end fitting such as end nut 402, a face seal 404, and frit 406. End nut 402 may be threaded on the exterior and may include exterior threads 408. In this way, end nut 402 may be shaped to mate with a connecting fitting which may include interior threads, such as connecting fitting 306 of FIG. 5.

Figure 7:
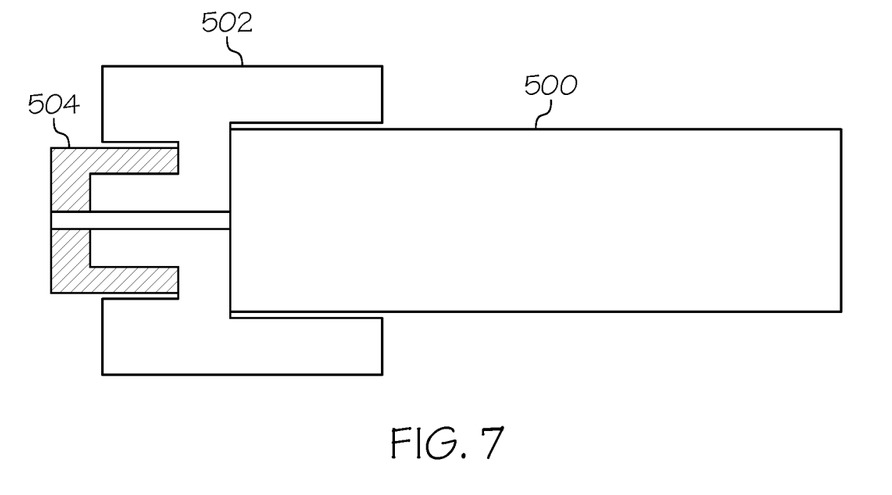
FIG. 7 also illustrates an example separation device with an end fitting in accordance with aspects of the present disclosure.

Referring now to FIG. 7, an example separation device with an end fitting is shown. The separation device (e.g., chromatography column 500) may include an end fitting such as end nut 502. End nut 502 may include face seal 504. Face seal 504 may be in the form of a cap seal and may have an internal or external lip such that the face seal itself does not fall off or dislodge from the end nut when not mated with a corresponding connecting fitting. Face seal 504 may be loadable against a surface of end nut 502. For example, upon being mated with a connecting fitting, face seal 504 may load against end nut 502 to create a seal. The cap seal form of face seal 504 may allow it to be removed from end nut 502 and replaced. Thus, in an implementation, face seal 504 may be retentive but also may be removeable from end nut 502, and also may be replaceable. This type of retentive face seal configuration may allow the separation device to be reused upon failure of the face seal.

Figure 8:
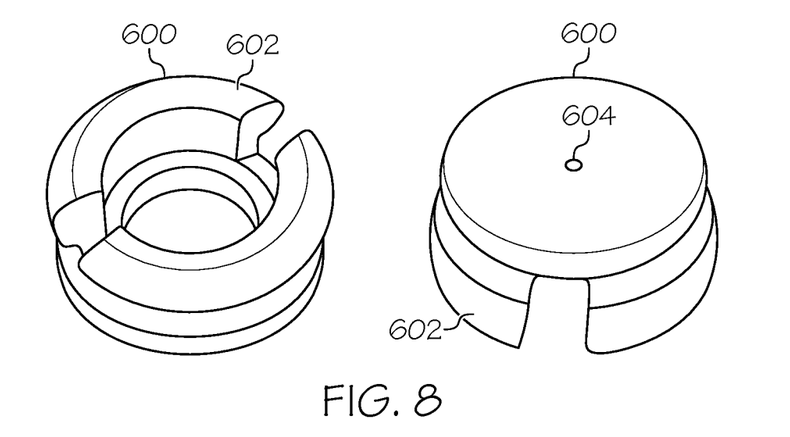
FIG. 8 shows bottom and top views of an example face seal in accordance with aspects of the present disclosure.

Referring now to FIG. 8, bottom and top views of an example face seal 600 are shown. Face seal 600 may be in the form of a cap seal and may have in an internal or external lip (e.g., lip 602). Face seal 600 may also have a face seal bore 604. Face seal 600 may correspond to face seal 504 of FIG. 7. On the left side of FIG. 8, a bottom view of face seal 600 shows a bottom side of lip 602. On the right side of FIG. 8, a top view of face seal 600 shows a top side of lip 602 and face seal bore 604.

Figure 9:
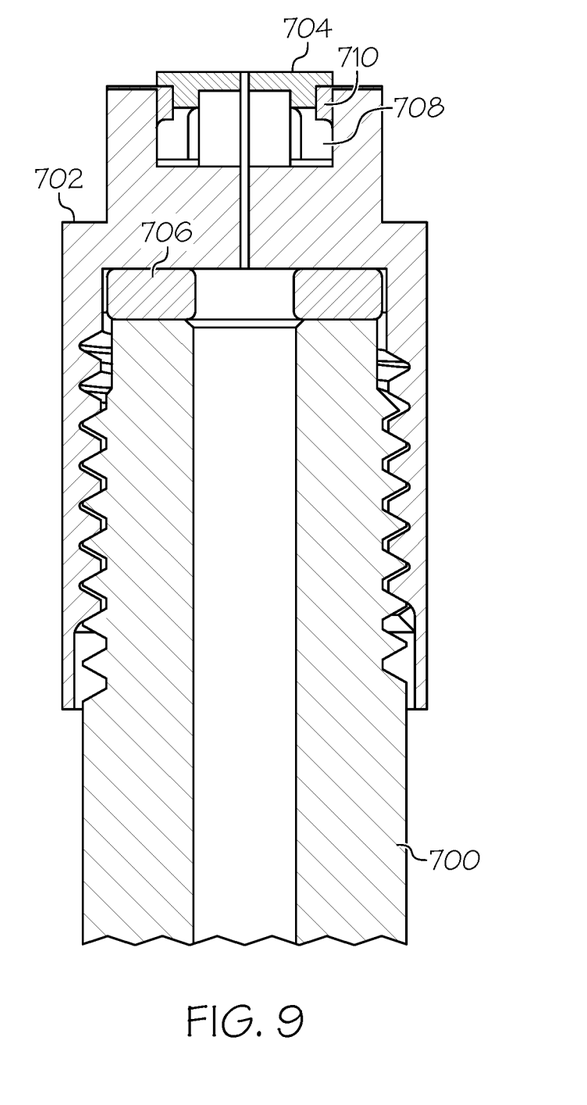
FIG. 9 illustrates an example separation device with an end fitting in accordance with aspects of the present disclosure.

Referring now to FIG. 9, an example separation device with an end fitting is shown. The separation device (e.g., chromatography column 700) may include an end fitting such as end nut 702, a face seal 704, and frit 706. Face seal 704 may be in the form of a cap seal and may have a lip 708. Face seal 704 may correspond to face seal 504 of FIG. 7 or face seal 600 of FIG. 8. End nut 702 may have a lip 710 formed therein which is shaped to sit on lip 708 of face seal 704 upon face seal 704 being received by end nut 702 or otherwise prevent face seal 704 from being dislodged from end nut 702. However, face seal 704 may be removeable from end nut 702 by squeezing or twisting face seal 704 such that lip 708 of face seal 704 slips past lip 710 of end nut 702.

Thus, in an implementation, face seal 704 may be retentive but also may be removeable from end nut 702, and also may be replaceable. This type of retentive face seal configuration may allow the separation device to be reused upon failure of the face seal.

In an implementation, a face seal may feature an incorporated geometry for ease of removal from the end nut and replacement. For example, a split fork, ring tool, or screwdriver may be used to pop the face seal off of the end nut and/or push a new face seal into the end nut.

Figure 10:
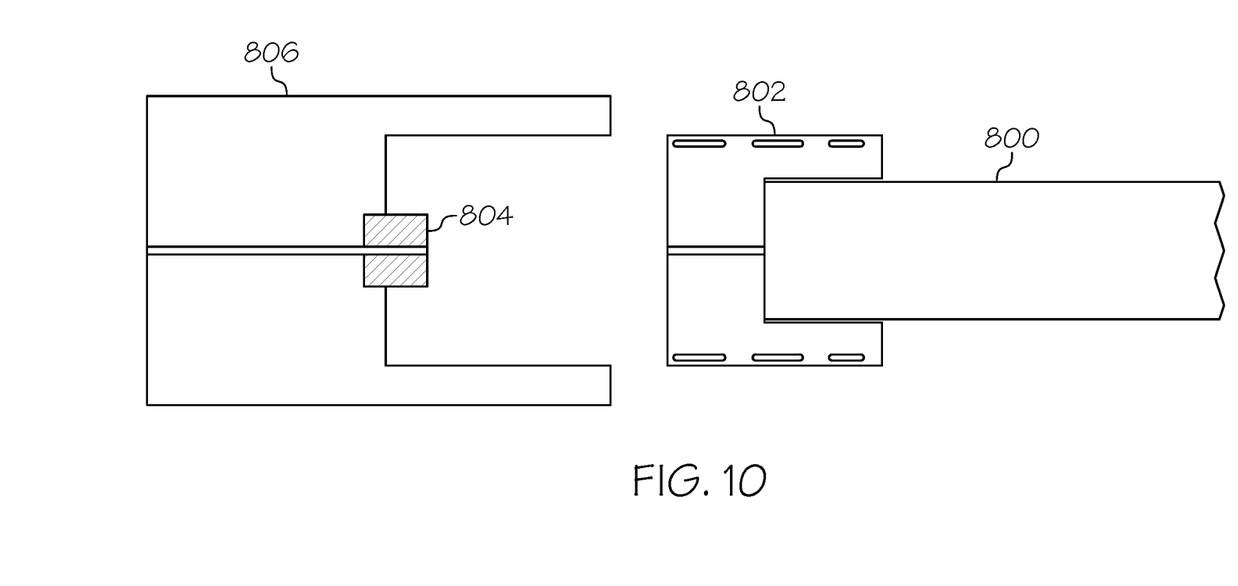
FIG. 10 illustrates an example separation device with an end fitting in accordance with aspects of the present disclosure.

Referring now to FIG. 10, an example separation device with an end fitting is shown. The separation device (e.g., chromatography column 800) may include an end fitting such as end nut 802. The separation device may further include a mating part 806 with an integrated face seal 804. Mating part 806 may be shaped to receive end nut 802 such that face seal 804 creates a seal with end nut 802 upon mating part 806 mating with end nut 802. Further, mating part 806 may be shaped to mate with a connector fitting. In an implementation, mating part 806 and end nut 802 may be threaded. In this way, mating part 806 may act as an adapter with a face seal and may be installed for multiple use applications. In an implementation, a separation device that is configured to have end nuts with face seals may also have an adapter designed for it which allows the separation device to be presented as a standard separation device or standard chromatography column such that it may be used in chromatography systems of different manufacturers.

It should be noted that while face seals have been described herein as being integrated with or otherwise installed in or implemented in end nuts and/or mating parts, other variations are within the scope of the present disclosure. For example, a face seal may be integrated with or otherwise installed in or implemented in a connecting fitting, and the face seal may otherwise operate in a manner similar to the face seals described herein as being integrated with end nuts or mating parts.

Figure 11:
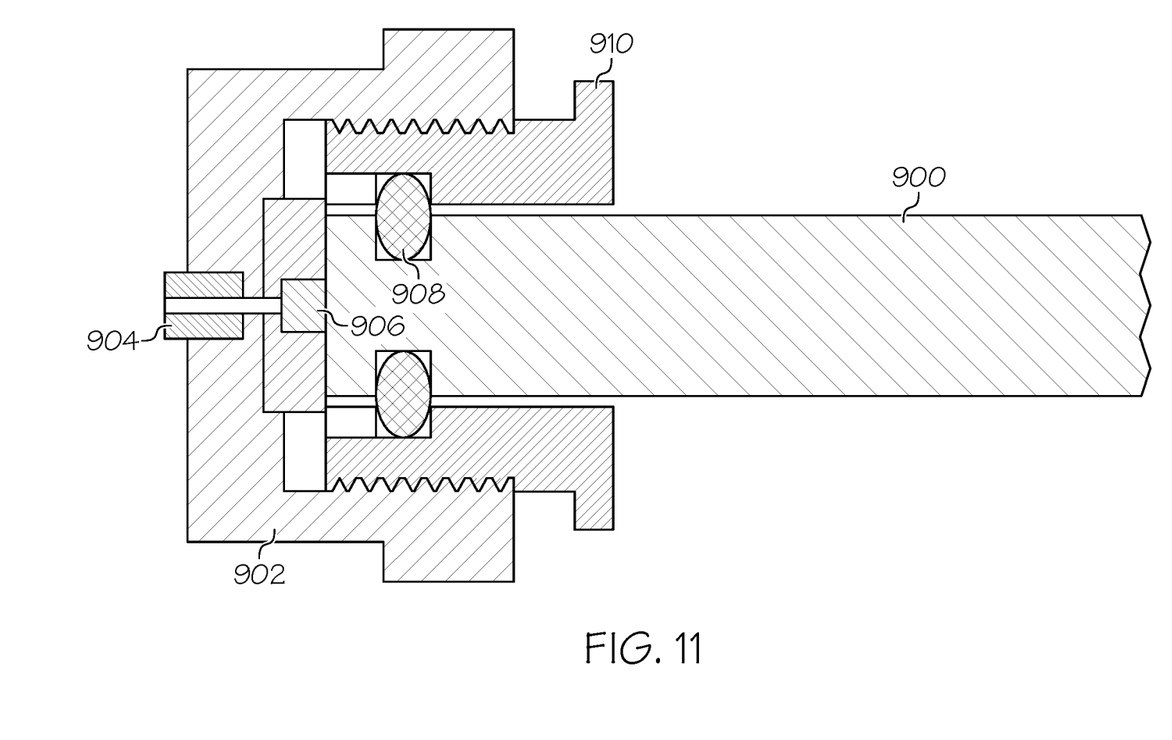
FIG. 11 illustrates an example separation device with an end fitting in accordance with aspects of the present disclosure.

For example, and referring now to FIG. 11, an example separation device with an end fitting is shown. The separation device (e.g., chromatography column 900) may include an end fitting such as end nut 902, a face seal 904, frit 906, ring 908, and screw 910. Ring 908 may be a metal ring on the end nut and column 900 may have a groove machined in it. Columns may typically have sintered frits that go on the outlet of the column. End nut 902 may have a frit ring pressed into it which may allow for tightening of the end nut without rotating the end nut against the column (e.g., by holding onto the end nut and tightening the screw). Loading may occur because the ring may be put at shear. The configuration of FIG. 11 may allow for a small column outlet distance to minimize dispersion. Wire rings may be used to reduce overall height.

In an implementation, an end nut may be an inlet end nut positioned on the inlet side of the separation device. The separation device may further include an outlet end nut positioned on the outlet side of the separation device. The inlet end nut and the outlet end nut may be different in at least one of shape and size to promote ease of use and prevent user error or damage to the separation device. For example, one end nut (e.g., inlet end nut) could be larger than the other (e.g., outlet end nut). This would make it more difficult to attempt to install the wrong end nut on the wrong side and prevent damage to the separation device from overuse.

Figure 12:
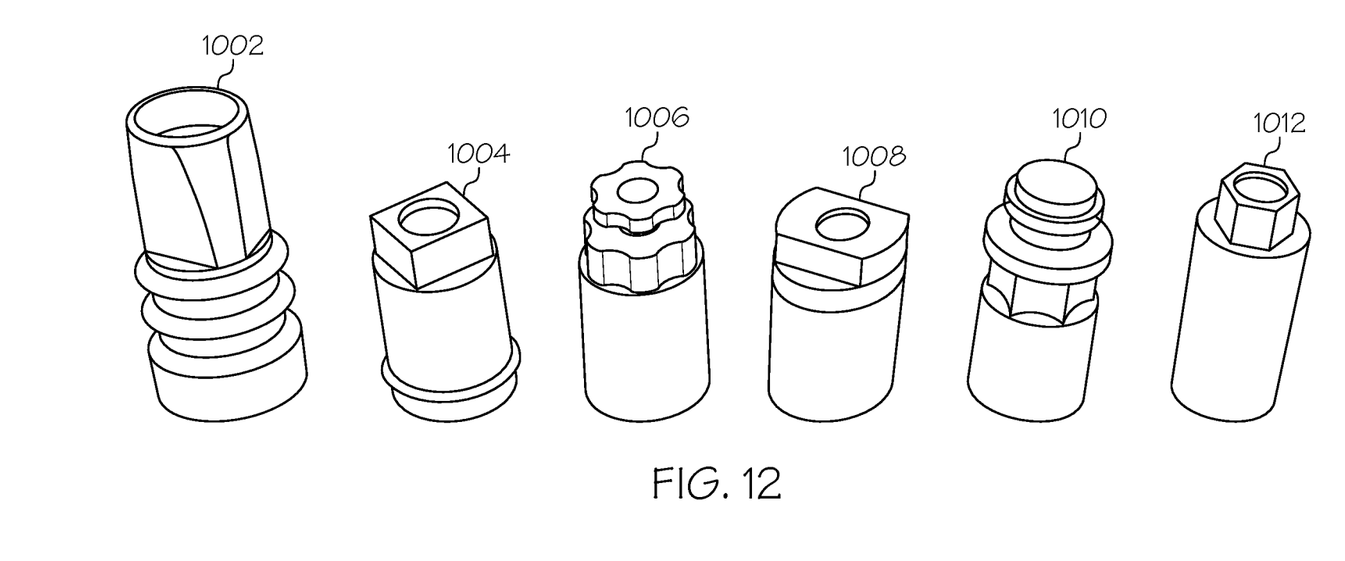
FIG. 12 shows examples of end nuts in accordance with aspects of the present disclosure.

Referring now to FIG. 12, end nuts of various shapes are shown. For example, end nut 1002 may have a round or cylindrical portion, end nut 1004 may have a square portion, end nut 1006 may have a star-shaped portion, end nut 1008 may have a stadium-shaped portion, end nut 1010 may have a round and threaded portion, and end nut 1012 may have a hexagonally shaped portion. These portions of end nuts 1002-1012 may be shaped to be received by a connecting fitting and may be shaped to have a face seal positioned therein.

Figure 13:
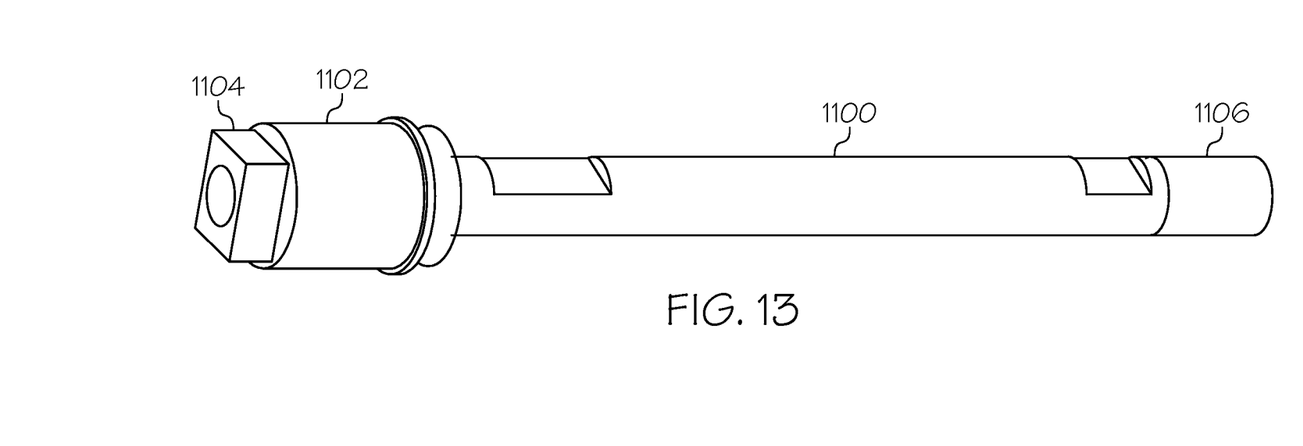
FIG. 13 shows an example chromatography column in accordance with aspects of the present disclosure.

Referring now to FIG. 13, an example chromatography column 1100 is shown. Chromatography column 1100 my include end nut 1102 and face seal 1104. A chromatography system may include chromatography column 1100, end nut 1102, and face seal 1104 and may have a connecting fitting shaped to receive end nut 1102. Upon the connecting fitting mating with end but 1102, face seal 1104 may form a seal between the connecting fitting and chromatography column 1100. Chromatography column 1100 may also have end nut 1106, which may be shaped differently than end nut 1102.

Face seals as described herein may be used to create improved seals by allowing for controlling an amount of stress in various locations of the seal and optimizing through-diameters and distances related to the seal. Typically, to form a seal, certain gasket forces must be applied on the material to ensure that the amount of stress on the seal is higher than the operating pressure at the seal. By optimizing or minimizing distances such as a through-hole length of the face seal, a fluidic path at an outlet of the separation device may be minimized such that any sample dispersion as sample elutes from the outlet of the column can be minimized. Further, reducing the size of the face seal closer to the diameter of the tube or fluidic conduit itself (e.g., 1/16 inch or 1.55 mm diameter) may allow for improved sealing.

Using the various techniques and features described in the present disclosure, end nuts and face seals as described herein may be implemented to improve fluidic seals between separation devices and connecting fittings and may thereby reduce at least one of sample carryover, sample dispersion, and leaking. While the techniques and features described in the present disclosure apply broadly to separation devices and have been illustrated by referring to chromatography columns, this is for illustrative purposes only and the end nuts, face seals, connecting fittings, and other components described herein may be implemented with other separation devices, such as, for example, chromatography traps.

While the invention has been shown and described with reference to specific embodiments, it should be understood by those skilled in the art that various changes in form and detail may be made therein without departing from the spirit and scope of the invention as recited in the accompanying claims.

What is claimed is:

1. An apparatus for a separation device, the apparatus comprising:
    an end nut shaped to be positioned on one of an inlet side of the separation device and an outlet side of the separation device, the end nut further shaped to mate with a connecting fitting;
    a cap seal having a device side, a fitting side and a lip having a gap therein, the cap seal positioned, at least in part, in the end nut on the device side of the cap seal, and the cap seal positioned to interface with the connecting fitting on the fitting side of the cap seal upon the end nut being mated with the connecting fitting; and
    a face seal bore of the cap seal being axially alignable with at least one of an inlet of the separation device on the inlet side of the separation device, and an outlet of the separation device on the outlet side of the separation device.

2. The apparatus of claim 1, wherein the end nut is threaded on an inner portion of the end nut and the end nut is shaped to receive the connecting fitting.

3. The apparatus of claim 1, wherein the cap seal is loadable against a surface of the end nut.

4. The apparatus of claim 1, wherein the cap seal is removeable from the end nut.

5. The apparatus of claim 1, wherein the cap seal is made, at least in part, from a material selected from the group consisting of: a polymeric material; a polyimide; polyether ether ketone; an alloy; and stainless steel.

6. The apparatus of claim 1, wherein at least a portion of the end nut is shaped at least one of: cylindrically; and hexagonally.

7. An apparatus for a separation device, the apparatus comprising:
   an end nut shaped to be positioned on one of an inlet side of the separation device and an outlet side of the separation device, the end nut further shaped to mate with a connecting fitting and having an end nut lip;
   a cap seal having a device side, a fitting side and a lip, the cap seal positioned, at least in part, in the end nut on the device side of the cap seal and positioned to interface with the connecting fitting on the fitting side of the cap seal upon the end nut being mated with the connecting fitting, wherein the lip of the cap seal is configured to engage the end nut lip to retain the cap seal in the end nut; and
   a face seal bore of the cap seal being axially alignable with at least one of an inlet of the separation device on the inlet side of the separation device, and an outlet of the separation device on the outlet side of the separation device.

8. The separation device of claim 7, wherein the connecting fitting comprises a protrusion loadable against the fitting side of the cap seal to create a fluidic seal.

9. The separation device of claim 7, wherein the end nut is an inlet end nut positioned on the inlet side of the separation device and the separation device further comprises an outlet end nut positioned on the outlet side of the separation device, wherein the inlet end nut and the outlet end nut are different in at least one of shape and size.

10. The separation device of claim 7, wherein the separation device is one of a chromatography column and a chromatography trap.

11. The apparatus of claim 7, wherein the end nut is threaded on an inner portion of the end nut and the end nut is shaped to receive the connecting fitting.

12. The apparatus of claim 7, wherein the cap seal is loadable against a surface of the end nut.

13. The apparatus of claim 7, wherein the cap seal is made, at least in part, from a material selected from the group consisting of: a polymeric material; a polyimide; polyether ether ketone; an alloy; and stainless steel.

14. The apparatus of claim 7, wherein at least a portion of the end nut is shaped at least one of: cylindrically; and hexagonally.

15. The apparatus of claim 7, further comprising the connecting fitting and wherein the connecting fitting comprises a protrusion loadable against the fitting side of the cap seal to create a fluidic seal.

16. The apparatus of claim 7, wherein the end nut is an inlet end nut, the apparatus further comprising a separation device and an outlet end nut, wherein the inlet end nut is positioned on the inlet side of the separation device and the outlet end nut is positioned on the outlet side of the separation device.

17. The apparatus of claim 7, wherein the separation device is one of a chromatography column and a chromatography trap.

* * * * *